UNITED STATES PATENT OFFICE.

WILLIAM N. BLAKEMAN, JR., OF MOUNT VERNON, NEW YORK.

OIL.

1,423,392. Specification of Letters Patent. Patented July 18, 1922.

No Drawing. Application filed October 5, 1921. Serial No. 505,626.

*To all whom it may concern:*

Be it known that I, WILLIAM N. BLAKEMAN, Jr., a citizen of the United States, and resident of the city of Mount Vernon, in the county of Westchester and State of New York, have invented a new and useful Improvement in Oils, which invention is fully set forth in the following specification.

The invention relates to the fatty oils, particularly the drying and semi-drying, and its object is, while securing satisfactory drying properties, to increase these oils in volume and render them adaptable for use in all oil compounds and plastic compositions, with a marked increase in the permanency of the ultimate product. This I accomplish by incorporating with these fatty oils, a proportion of vegetable non-drying oil or fat having low melting and solidifying points, and a high resistance to hydrolysis, such as cocoanut oil or palm-kernel oil. These substances, in this climate, pass through various changes in physical condition, from clear and flowing in summer, to semi-solid or solid in cooler, or winter weather. On account of its abundance, I prefer to use cocoanut oil, but I consider palm-kernel oil to be its equivalent for my purpose.

The fatty oils which come within the economical scope of my invention are linseed, perilla, tung, fish, menhaden, soya bean, cottonseed, sunflower-seed and the like, and it will be found that the cocoanut oil is miscible with these oils in varying proportions, according to their specific gravity and interstitial capacity, by agitation, but heat may be used to accelerate the mixture. As little as 5% of cocoanut oil will exhibit an appreciable effect; but as high as 50% or 60% can be used in some cases, which mixture, when properly blended and spread on a plain surface will exhibit a pellicle after a few hours, especially in broad sunlight, and in a very much shorter time when accelerated by the usual quantity of a suitable liquid drier.

The most remarkable composition is that produced by combining cocoanut oil with tung oil. I have discovered that tung oil is a solvent, at common temperatures, for cocoanut oil in any of its phases, and when properly mixed and blended by agitation, the mixture will not break, separate, or precipitate, but will remain clear even at temperatures much below that at which cocoanut oil chills to a solid condition. This mixture can be used as a basal factor, of great economical efficiency, in many compositions, but its activity can be greatly accelerated by heating the mixture for a short time to blend the oils and drive off any volatile matter, associated or suspended, a temperature of about 250° Fahr. being sufficient for this purpose.

For general purposes 40% of cocoanut oil can be used with the tung oil, and will be found to be an all-round workable factor. This proportion may be introduced and heated at one time, but when the cocoanut oil is added in successive, or cumulative, charges of 10% each, and the mixture heated after each charge, the cumulative effect is very marked.

This combination of cocoanut oil and tung oil, when spread on a plain surface will indurate into a film of great brilliancy, and will prove a valuable factor in all oil-vehicles for paints or for varnish films. Not only may all the oils be used, by compounding, but all the various pigments whether hydrated or anhydrous, as the cocoanut oil will be found to increase the spreading power of all pigments when ground in a vehicle of which it forms a part. The ultimate paint product will also be found to be greatly resistant to the deteriorating effect of atmospheric and abrasive influences, because of the high resistance to hydrolysis of the cocoanut oil.

The tendency of tung oil in drying to shrink and contort, as well as its tendency and that of some other oils, to polymerize and gelatinize when subjected to high temperatures, will be very much modified by the combination with cocoanut oil.

It will, of course, be understood that by the term "oil," as used in this specification, and in the claims, to designate the vegetable oils and fats which have low melting and solidifying points and a high resistance to hydrolysis, I intend to cover the use of such substances whether they are in a liquid, semi-solid, or solid, condition at the time of use.

The use of such non-drying vegetable oils and fats in paint-vehicles is specifically claimed in application No. 461961, filed by me on the 16th day of April, 1921, and their use in pigment and paint compositions is claimed in applications Nos. 505624 and 505625 filed herewith.

Having thus fully described my invention, I claim:

1. A mixture of tung oil; and a vegetable non-drying fatty oil having low melting and solidifying points and a high resistance to hydrolysis.

2. A mixture of tung oil and cocoanut oil.

WM. N. BLAKEMAN, Jr.